United States Patent
Cipolla

[19]

[11] Patent Number: 6,097,595
[45] Date of Patent: Aug. 1, 2000

[54] MECHANISM FOR AUTOMATIC DEPLOYMENT OF LEGS FOR PORTABLE PERSONAL COMPUTER FOR ENHANCED COOLING

[75] Inventor: Thomas Mario Cipolla, Katonah, N.Y.

[73] Assignee: International Business Machines Corporation, Armonk, N.Y.

[21] Appl. No.: 08/988,328

[22] Filed: Dec. 10, 1997

[51] Int. Cl.[7] ..................................................... H05K 5/00
[52] U.S. Cl. ........................ 361/687; 361/683; 248/685; 248/688; 248/923
[58] Field of Search ..................................... 361/683, 681, 361/680, 687, 686; 364/708.1; 248/685, 688, 923

[56] References Cited

U.S. PATENT DOCUMENTS

| | | | |
|---|---|---|---|
| 4,571,456 | 2/1986 | Paulsen et al. | 361/680 |
| 4,946,300 | 8/1990 | Makita | 361/680 |
| 5,347,424 | 9/1994 | Akahane | 361/680 |
| 5,469,327 | 11/1995 | Cheng | 361/680 |
| 5,742,475 | 4/1998 | Riddiford | 361/681 |
| 5,754,395 | 5/1998 | Hsu et al. | 361/680 |

*Primary Examiner*—Leo P. Picard
*Assistant Examiner*—Lisa Lea-Edmonds
*Attorney, Agent, or Firm*—Pollock, Vande Sande & Amernick, R.L.L.P.

[57] ABSTRACT

An automatically deploying and retracting leg for a portable personal computer including a base and a display. At least one leg is arranged in the base and moves downwardly as it is deployed. At least one deploying mechanism is interconnected with the at least one leg and the display so as to cause the at least one leg to deploy and retract upon moving the display respectively between and open and a closed position.

36 Claims, 9 Drawing Sheets

MECHANISM FOR AUTOMATIC DEPLOYMENT OF LEGS FOR PORTABLE PERSONAL COMPUTER FOR ENHANCED COOLING

FIELD OF INVENTION

This present invention relates to automatically deploying and retracting feet for a portable personal computer, or laptop computer, a mechanism for automatically deploying and retracting the feet, a portable personal computer that includes automatically deploying and retracting feet, and enhancing the cooling capacity of portable personal computers.

BACKGROUND OF THE INVENTION

Since their conception and design, portable personal computers, as with all computers, have faced the issue of thermal management as a result of heat generated by the processor and other components of the computer. As is well known, excessive heat can degrade performance of computers and result in damage to components of computers. As a result, thermal management is often an important consideration in computer design.

In the last few years, thermal dissipation requirements of portable computers have increased. For example typical portable computers generate heat that must be dissipated in the range of from about 10 watts to about 20 watts and beyond. This is at least in part a result of ever increasing CPU performance. For example, see Yu, THE FUTURE OF MICROPROCESSORS, IEEE Micro, December 1996, pp. 46–53, the entire contents of which are hereby incorporated by reference. Additional heat is also generated by increasing functions performed by portable personal computers, such as digital video disk (DVD), modem, audio, video, among other devices, now often included in portable personal computers. It is expected that future portable personal computers will provide even greater processing performance and functions, thereby continuing the trend of increasing heat dissipation.

For example, with an A4 form factor, i.e., with a 297 mm by 210 mm footprint, the cooling limit for a PC without fan is from about 15 to about 20 watts. Providing more cooling than these limits can not only be a competitive advantage, but also a product differentiation.

SUMMARY OF THE INVENTION

In addressing the thermal management requirements of portable personal computers, the present invention provides a new mechanism for automatically deploying and retracting legs of a portable personal computer to enhance cooling capacity of the computer.

Accordingly, aspects of the present invention provide an automatically deploying and retracting leg assembly for a portable personal computer including a base and a display. The automatically deploying and retracting leg assembly includes at least one leg arranged in the base and moving downwardly as it is deployed. At least one deploying mechanism is interconnected with the at least one leg and the display so as to cause the at least one leg to deploy and retract upon moving the display respectively between an open and a closed position.

Other aspects of the present invention provide a portable personal computer including a base, a display pivotably joined to the base, at least one leg arranged in the base and moving downwardly as it is deployed, and at least one deploying mechanism interconnected with the at least one leg and the display for automatically deploying and retracting the at least one leg as the display is moved between an open and a closed position, respectively.

Additional aspects of the present invention provide a method for deploying and retracting at least one leg of a portable personal computer including a base and a display. The method includes providing at least one leg arranged in the base and moving downwardly as it is deployed. At least one deploying mechanism is provided interconnected with the at least one leg and the display so as to cause the at least one leg to deploy and retract upon moving the display respectively between and open and a closed position. The display is moved from a closed to an open position, thereby causing the at least one deploying mechanism to cause the at least one leg to deploy by moving downwardly relative to the base. The display is moved from the open to the closed position, thereby causing the at least one deploying mechanism to cause the at least one leg to retract by moving upwardly relative to the base.

Further aspects of the present invention provide a method for temperature management in a portable personal computer including a base and a display. The method includes providing the computer with at least one automatically deploying and retracting leg arranged in the base and moving downwardly as it is deployed and at least one deploying mechanism interconnected with the at least one leg and the display so as to cause the at least one leg to deploy and retract upon moving the display respectively between and open and a closed position. The computer is turned on. The display is moved from a closed position to an open position, thereby causing the at least one deploying mechanism to cause the at least one leg to deploy by moving downwardly relative to the base. The display is moved from the open to the closed position, thereby causing the at least one deploying mechanism to cause the at least one leg to retract by moving upwardly relative to the base.

Still other objects and advantages of the present invention will become readily apparent by those skilled in the art from the following detailed description, wherein it is shown and described only the preferred embodiments of the invention, simply by way of illustration of the best mode contemplated of carrying out the invention. As will be realized, the invention is capable of other and different embodiments, and its several details are capable of modifications in various obvious respects, without departing from the invention. Accordingly, the drawings and description are to be regarded as illustrative in nature and not as restrictive.

BRIEF DESCRIPTION OF THE DRAWINGS

The above-mentioned objects and advantages of the present invention will be more clearly understood when considered in conjunction with the accompanying drawings, in which.

DETAILED DESCRIPTION OF VARIOUS AND PREFERRED EMBODIMENTS OF THE INVENTION

Figure 1:
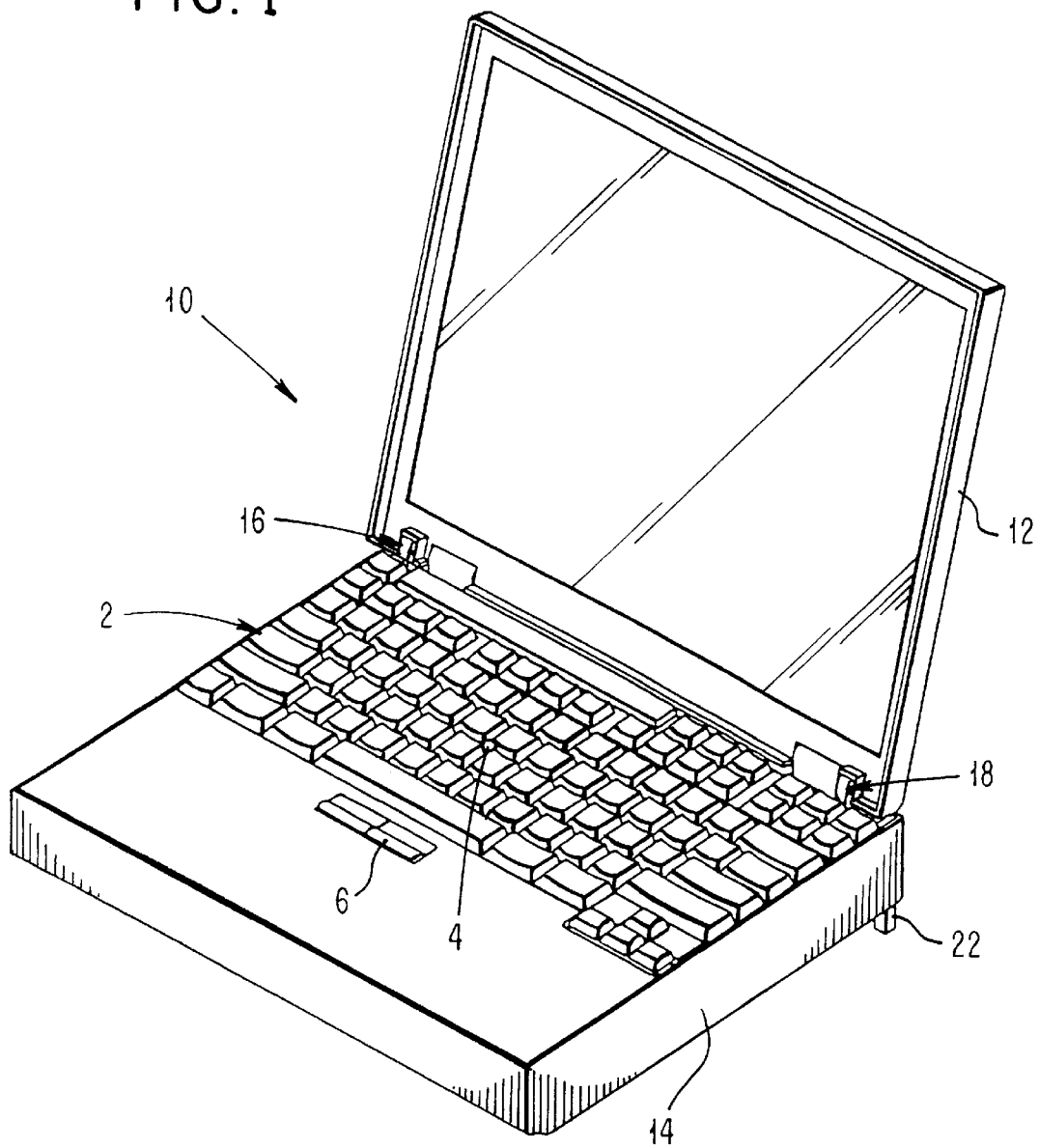
FIG. 1 represents a top front perspective view of an embodiment of a portable personal computer (PPC) according to the present invention with its display panel in an open position and the legs deployed.

The mechanism disclosed herein enhances the performance of a portable personal computer by providing the computer with at least one leg and a mechanism for automatically deploying and retracting the at least one leg. The present invention permits at least one leg included in a portable personal computer to automatically deploy upon the movement of a display of the computer from an opened to a closed position. Furthermore, the present invention automatically retracts the at least one leg upon the movement of the display from a closed to an open position. The present invention may provide automatically extending and retracting leg(s) without substantially increasing the size, complexity and/or weight of a portable personal computer.

Deploying the at least one leg raises the back of the computer, thus allowing ambient air to connect additional heat away from the computer's bottom surface. Dissipating heat may prevent damage to components of the computer and/or degradation of the components' performance. Additionally, increased heat dissipation characteristics may permit higher performance processors and/or other components to be included in a portable personal computer and additional components, such as additional drives, to be included in the computer.

According to typical embodiments, thermal dissipation enhancement utilizing the present invention may permit approximately two additional watts of power to be dissipated as compared to when the computer has its bottom surface substantially resting on a desk or table. For typical portable personal computers, this represents additional passive cooling capacity of approximately 50 per cent.

One way to increase heat dissipation from any body is to expose a greater surface area of the body to ambient air. The same is true for portable personal computers. One surface on a portable personal computer that often is not exposed to the ambient air is the bottom surface of the base of the computer.

Through the present invention, it has been shown that raising the back end of the bottom surface of the base of a portable personal computer above a surface supporting the computer will allow natural convection to take place on the bottom surface of the computer base and thus enhance cooling capability. For example, according to one embodiment of the present invention, raising the back end of a portable personal computer by from about 15 mm to about 20 mm increases heat dissipation just under about two watts. According to another embodiment, a rise of the back bottom end of the computer by about 30 mm increases heat dissipation by almost about three watts. Since not raising the back typically permits approximately five watts of heat to be dissipated from a portable personal computer, the present invention can increase natural convection cooling on the order of from about 35% to about 50%.

Of course, the amount of heat dissipated from a portable personal computer may vary, depending upon the design of the computer, the materials utilized in making the computer components, such as the base, the thickness of the base, allowable temperature rise above ambient, the uniformity of outside surface temperature, and other factors. However, once aware of the contents of the disclosure herein, without undue experimentation, one skilled in the art could determine the amount of cooling desired and a corresponding level that the back bottom end of the base of the computer must be raised to result in the desired degree of cooling.

FIG. 1 shows a perspective view of a portable personal computer 10. The portable personal computer typically includes a display panel/cover 12 and a base or bottom cover 14. The portable personal computer shown in FIG. 1 is shown with its display panel/cover 12 in an open position. The exact position of the display in an open position may vary, depending upon the position that the operator determines is best for viewing the display.

The base 14 typically houses, among other things, the central processing unit (not shown), memory (not shown), a keyboard 2, pointing device 4, clicking device 6, modems (not shown), speakers (not shown), and drives (not shown), such as hard disk drive, floppy disk drive, cd-rom drive, digital video disk drive. Of course, different portable personal computers have different configurations. Also, the different portable personal computers may have appearances that differ from the computer shown in FIG. 1.

The portable personal computer shown in FIG. 1 also includes an embodiment of automatically deploying and retracting legs according to the present invention. One leg 22 is visible in FIG. 1. The leg in the embodiment shown in FIG. 1 is in a fully deployed position. FIG. 1 also shows portions of an embodiment of a leg deploying and retracting mechanism according to the present invention.

Figure 2:
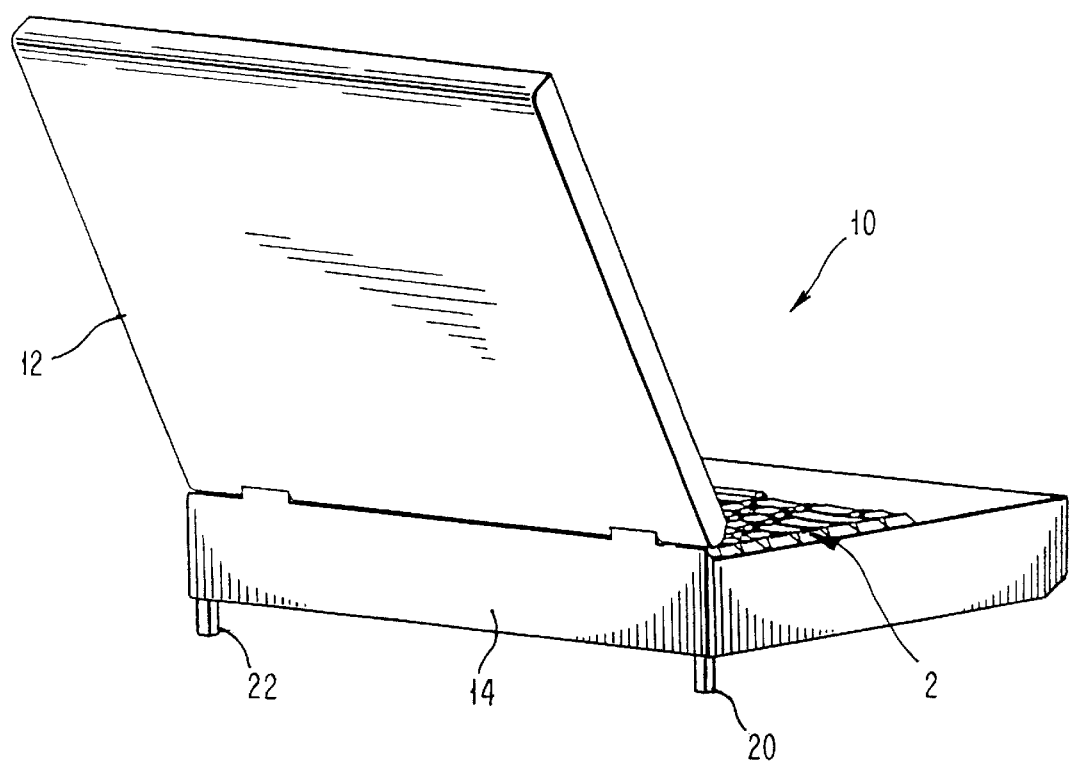
FIG. 2 represents a top rear perspective view of an embodiment of a portable personal computer according to the present invention with its display panel in an open position and the legs deployed.

FIG. 2 shows a perspective view of the back of the embodiment of the portable personal computer shown in FIG. 1. As shown in FIG. 2, the embodiment shown in FIG. 1 includes two automatically deploying and retracting legs 20 and 22.

Figure 3:
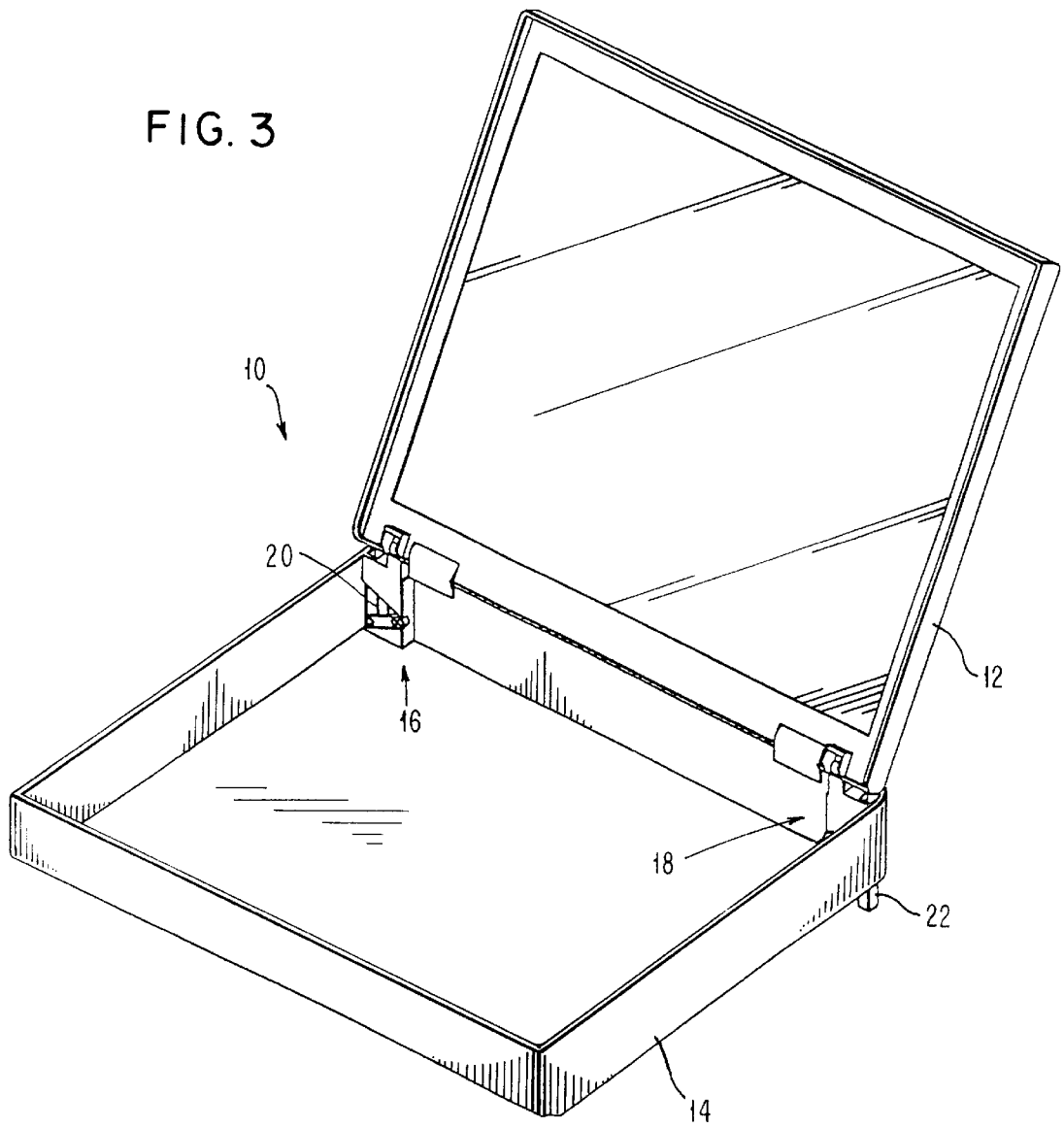
FIG. 3 represents a top front perspective view of an embodiment of a portable personal computer according to the present invention with its display panel in an open position and elements that normally reside in the base of the computer such as the keyboard, processor, and disk drive, removed.

FIG. 3 shows a perspective view of the embodiment of the portable personal computer shown in FIGS. 1 and 2 with elements of the computer that typically reside in the bottom cover 14 such as the keyboard 2, processor (not shown), disk drive (not shown), and other elements removed. Typically such a computer would be supported on a surface, such as a table, desk, airplane tray table, or other surface.

In the left and right interior rear corners of bottom cover 14 are two symmetrical but otherwise substantially identical embodiments of an automatic deploying and retracting mechanism 16 and 18. Automatically deploying and retracting mechanisms 16 and 18 automatically operate to vertically move legs 20 and 22 to deploy the legs when a user moves display cover 12 from an closed position to an open position. Automatically deploying and retracting mechanisms 16 and 18 also automatically operate to retract the legs when a user moves the display cover from an open position to a closed position.

As in the embodiments shown in FIGS. 1–3, the present invention may include two automatically deploying and retracting legs. However, the present invention could include only one centrally located leg. In some instance, more that two legs may also be desirable, such as three or four. Therefore, it should be considered that the present invention includes at least one automatically deploying and retracting leg.

Figure 4:
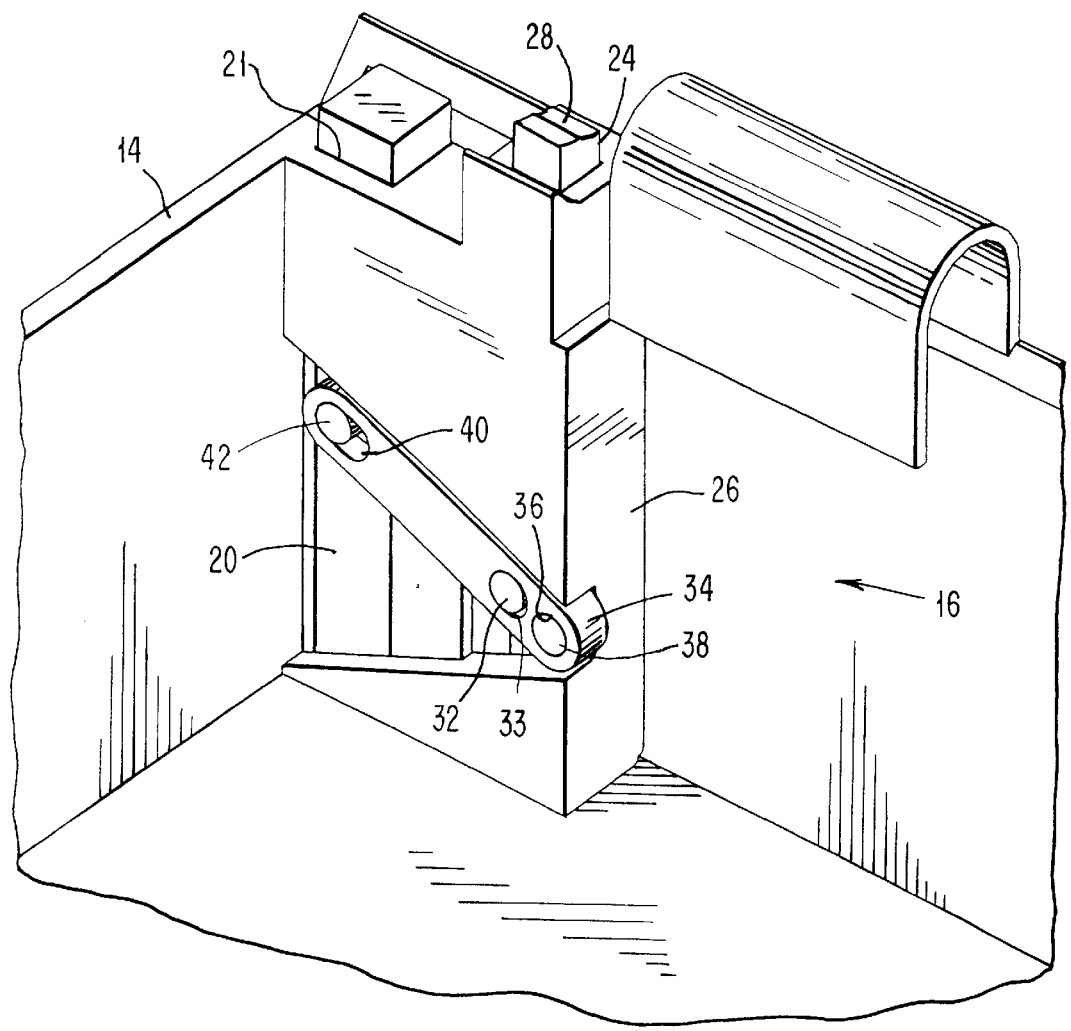
FIG. 4 represents a top front perspective close-up view of the embodiment of the leg deployment and retraction mechanism shown in FIG. 3 with the display removed and the leg in a retracted position.

FIG. 4 shows a close up view of the automatic deploying and retracting mechanism 16 shown in FIG. 3. In the embodiment shown in FIG. 4, the display cover 12 has been removed. In FIG. 4, the automatic leg deploying and retracting mechanism 16 is shown in a position it would be in if display cover 12 were in a closed position.

The automatic leg deploying and retracting mechanism 16 may be housed within automatic leg deploying and retracting mechanism housing. FIG. 4 shows an embodiment of an automatic leg deploying and retracting mechanism housing 26 according to the present invention. Housing 26 may be a separate element joined to bottom cover 14. Alternatively, housing 26 and bottom cover 14 may be molded as a single integral member.

The embodiment of the housing 26 shown in FIG. 4 only partially encloses the automatic leg deploying and retracting mechanism. Alternatively, automatic leg deploying and retracting mechanism housing 26 may entirely enclose the automatic leg deploying and retracting mechanism.

The embodiment of the automatic leg deploying and retracting mechanism shown in FIG. 4 includes a plunger 24. Plunger 24 includes a cam surface 28 for engaging a cam (not shown in FIG. 4) on the display panel. In the embodiment shown in FIG. 4, the plunger moves substantially vertically in a downward direction relative to the computer in response to the action of the display panel cam on cam surface 28. However, other embodiments of the automatic leg deploying and retracting mechanism may include a plunger or other member that slides substantially horizontally or in an other direction or pivots in response to the action of the display panel cam on cam surface 28.

Plunger 24 is slidably mounted in housing 26 such that it moves substantially in the vertical direction. As stated above, cam surface 28 is acted upon by a cam (not shown in FIG. 2) on display 12. In the embodiment shown in FIG. 4, a downward force is applied on cam surface 28 by cam 30 (not shown in FIG. 2) so as to cause plunger to move downward.

The embodiment of the automatic leg deploying and retracting mechanism may also include a pivot lever 34. Pivot lever 24 may be pivotably mounted to bottom cover 14 and/or automatic leg deploying and retracting mechanism housing 26. In the embodiment shown in FIG. 4, pivot lever 34 is mounted with a pivot lever mounting pin 38 to housing 26. For receiving pin 38, pivot lever 34 includes a pivot lever mounting pin receiving passage 36 for receiving the pivot lever mounting pin. The pivot lever mounting pin may include elements, such as tabs and indents, for retaining the pivot lever on the pivot lever mounting pin.

Pivot lever 34 and plunger 24 may include interengaging members for pivotably interconnecting the pivot lever to the plunger. For example, either the pivot lever or the plunger may include a pin. The other of the pivot lever and the pin may include a passage for receiving the pin. The passage included on either the pivot lever or the plunge may be elongated in a direction so as to permit the pin to move within the passage as the plunger and the lever arm move relative to each other.

In the embodiment shown in FIG. 4, pin 32 is provided on plunger 24 and a pin receiving passage 33 is provided on pivot lever 34. As can be seen in FIG. 4, pin receiving passage 33 is elongated in the direction of the longitudinal axis of pivot lever 34 so as to accommodate the relative movement of the pin relative to the pivot lever that occurs as the plunger and pivot lever move relative to each other. As will be discussed below in greater detail, downward movement of the plunger 24 will cause a counterclockwise rotation of pivot lever 34.

The embodiment of the automatic leg deploying and retracting mechanism shown in FIG. 4 also includes a leg 20. As stated above, the present invention includes at least one leg. Preferred embodiments of the present invention include two legs, one located in the vicinity of each the back corners of the computer. Preferred embodiments also include one automatic leg deploying and retracting mechanism for each leg.

The leg(s) may have a variety of shapes and sizes, depending upon the application. For example, as stated above, the leg(s) may be made with varying lengths so as to cause the back bottom end of the computer that includes the leg(s) to be raised by varying heights. The length of the leg(s) may vary, depending upon the amount of cooling desired. Another consideration that may be taken into account when determining the length of the leg(s) includes the desired angle of the keyboard with respect to the user. Typically, the leg(s) may prop up the back bottom end of the computer by about 10 mm to about 30 mm. The length of the leg may also be a function of the amount of passive cooling that is desired to be derived from the bottom surface of the computer.

As in the embodiment shown in FIG. 4, the leg and the pivot lever may be interconnected by a pin and a passage, similar to the pivot lever and the plunger. As with the interconnection between pivot lever and the plunger, either the leg or the pivot lever may include a pin and the other of the pivot lever and the leg may include a passage for receiving the pin. Again, similar to the interconnection between pivot lever and the plunger, the pin receiving passage may be elongated to permit relative movement of the pin relative to the passage as the leg and the pivot lever move relative to each other.

The embodiment of the automatic leg deploying and retracting mechanism shown in FIG. 4 includes a pin provided on the leg 20. The pin may be attached to the leg or to the pivot member, such as with adhesive, a screw, or with other means. Alternatively, the pin and the leg or pivot member could be molded as a single unitary member.

In the embodiment shown in FIG. 4, the pivot member includes a leg pin receiving member passage 40. As stated above, the pin receiving passage may be elongated to accommodate movement of the pin relative to the pin receiving passage.

Pivot member is pivotably interconnected with at least one leg member. According to other embodiments, one plunger and/or one pivot member could operate more than one leg member. The leg member in the embodiment shown in FIG. 4 is housed within a leg receiving passage 21 in housing 26.

The leg receiving passage 21 shown in FIG. 4 is partially exposed by an opening in the housing that accommodates movement of pivot lever 34. The plunger 24 is also partially exposed by the same opening in the housing. According to other embodiments, the space accommodating movement of the pivot arm may not be exposed. In such embodiments, the housing or a separate piece of the housing may cover the space.

In the embodiment shown in FIG. 4, as the display 12 is rotated from a closed position to an open position the cam on the display (not shown in FIG. 4) acts on cam surface 28 provided on plunger. The cam on the display is shaped such that as the display is rotated, the cam on the display applies force to the cam surface on the plunger, causing the plunger to move downward in the view shown in FIG. 4. The cam 30 on the display is attached to or formed as part of display cover 12.

As the display cover is opened, cam 30 causes plunger 24 to move downward. Pin 32, which is attached to plunger 24 protrudes through pivot lever 34 by way of pin receiving passage 36. The vertical motion of plunger 24 and pin 32 causes pivot lever 34 to pivot about pin 38 which is fixed to bottom cover 14. In the embodiment shown in FIG. 4, pivot lever 34 pivots counterclockwise. However, in other embodiments, the plunger, pivot lever, and leg may be arranged so as that the pivot lever rotates clockwise. Pivot lever may also rotate clockwise if the leg is on the opposite side of the bottom cover from that shown in FIG. 4.

As stated above, passage 36 may be elongated to compensate for straight line movements of pin 32 and the curved path of pivot lever 34. On the opposite end of pivot lever 34 is another elongated passage 40. In the embodiment shown in FIG. 4, pin 42 passes through passage 40. Pin 42 is attached to leg 20. Leg 20 is slidably mounted in housing 26 similar to plunger 24 to allow it to move in the substantially vertical direction. When pivot lever 34 moves downward its action causes pin 42 and, thus, leg 20 to move downward as well.

The distance between pins 38 and 42 and pins 38 and 32 may vary, depending upon the desired amount of downward movement of the leg relative to movement of the plunger. In the embodiment shown in FIG. 4, the straight line distance between pins 38 and 42 is approximately 20 mm and the distance between pins 38 and 32 is approximately 4 mm. Since the ratio of these distances determines the ratio of motion between plunger 24 and leg 20, leg 20 moves about five times as far as plunger 24. These distances can be varied to a substantial degree depending on the amount of room available in a particular portable personal computer and still function within the spirit of this invention.

Figure 5:
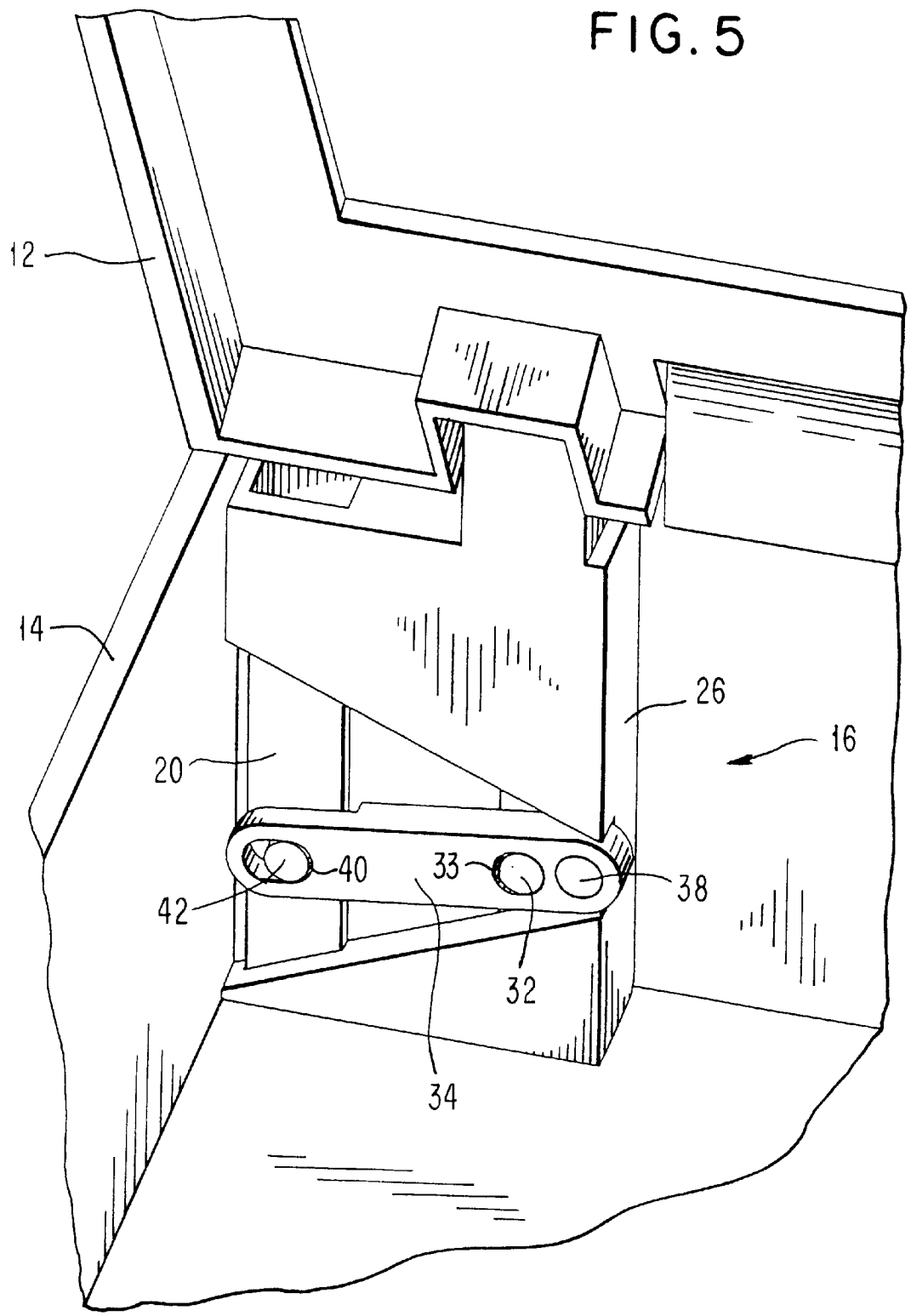
FIG. 5 represents a top front perspective view of the embodiment of the leg deployment and retraction mechanism shown in FIGS. 3 and 4 with the display located between an opened and a closed position with the leg in a partially deployed position.

FIG. 5 shows another perspective view of the embodiment shown in FIG. 4. However, FIG. 5 also shows the display in place attached to the base of the computer. The top of the cam surface on the plunger is hidden within a passage in the display. The position of the display shown in FIG. 5 is between a closed and an opened position, with the leg partially deployed.

Figure 6:
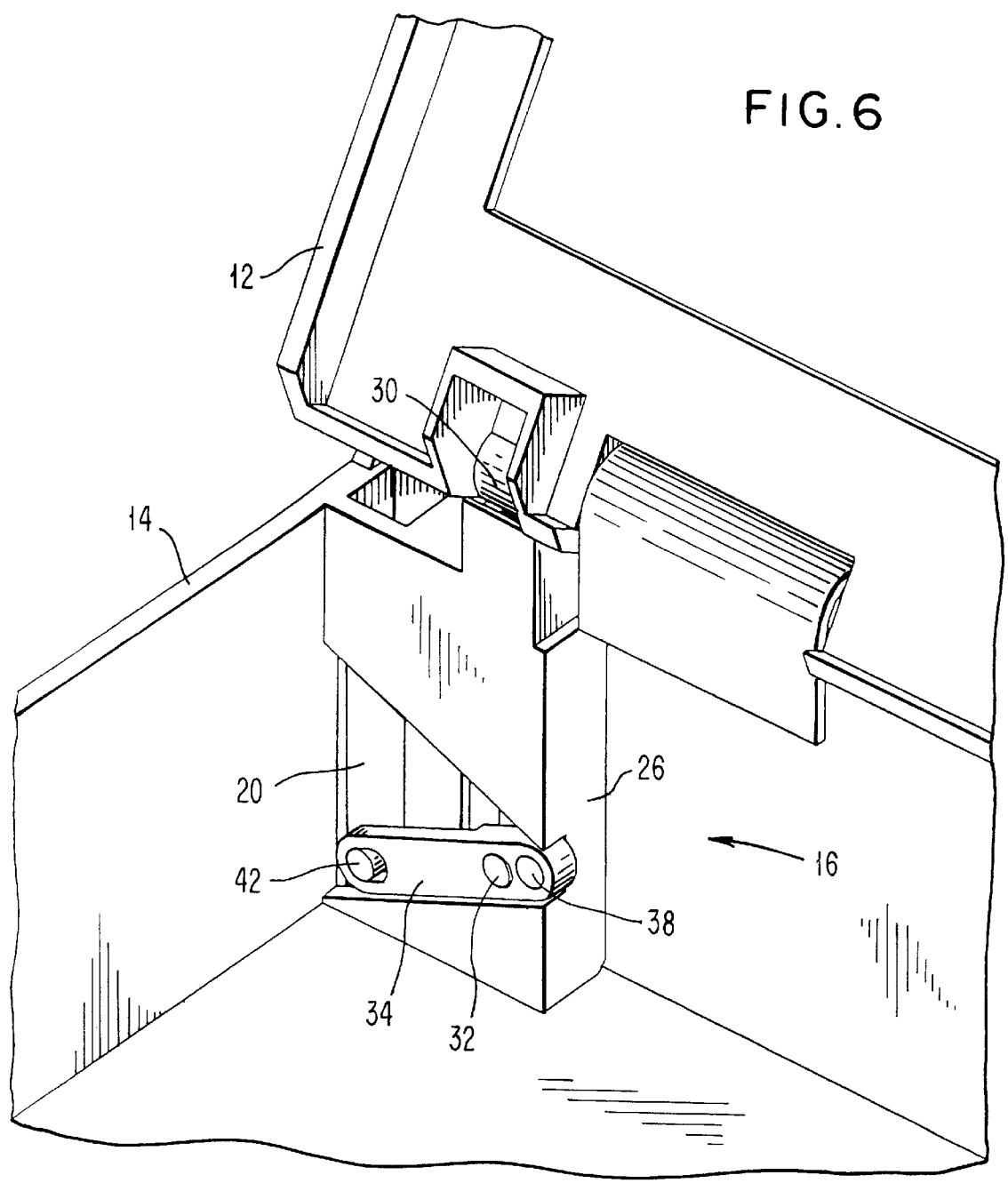
FIG. 6 represents a top front perspective view of the embodiment of the leg deployment and retraction mechanism shown in FIGS. 3–5 with the display located between an opened position with the leg in a fully deployed position.

FIG. 6 shows still another perspective view of the embodiment shown in FIGS. 4 and 5. In FIG. 6, the leg has been fully deployed and the display moved to a useable position. Since the angle of the display relative to the bottom cover may vary, depending upon the user's comfort, lighting conditions, and relative location of the user and the computer, among other factors, the display will not always be in the same position when in an open position. To help ensure that the legs are deployed, they may achieve their fully deployed position prior to the display approaching a useable open position.

Figure 7:
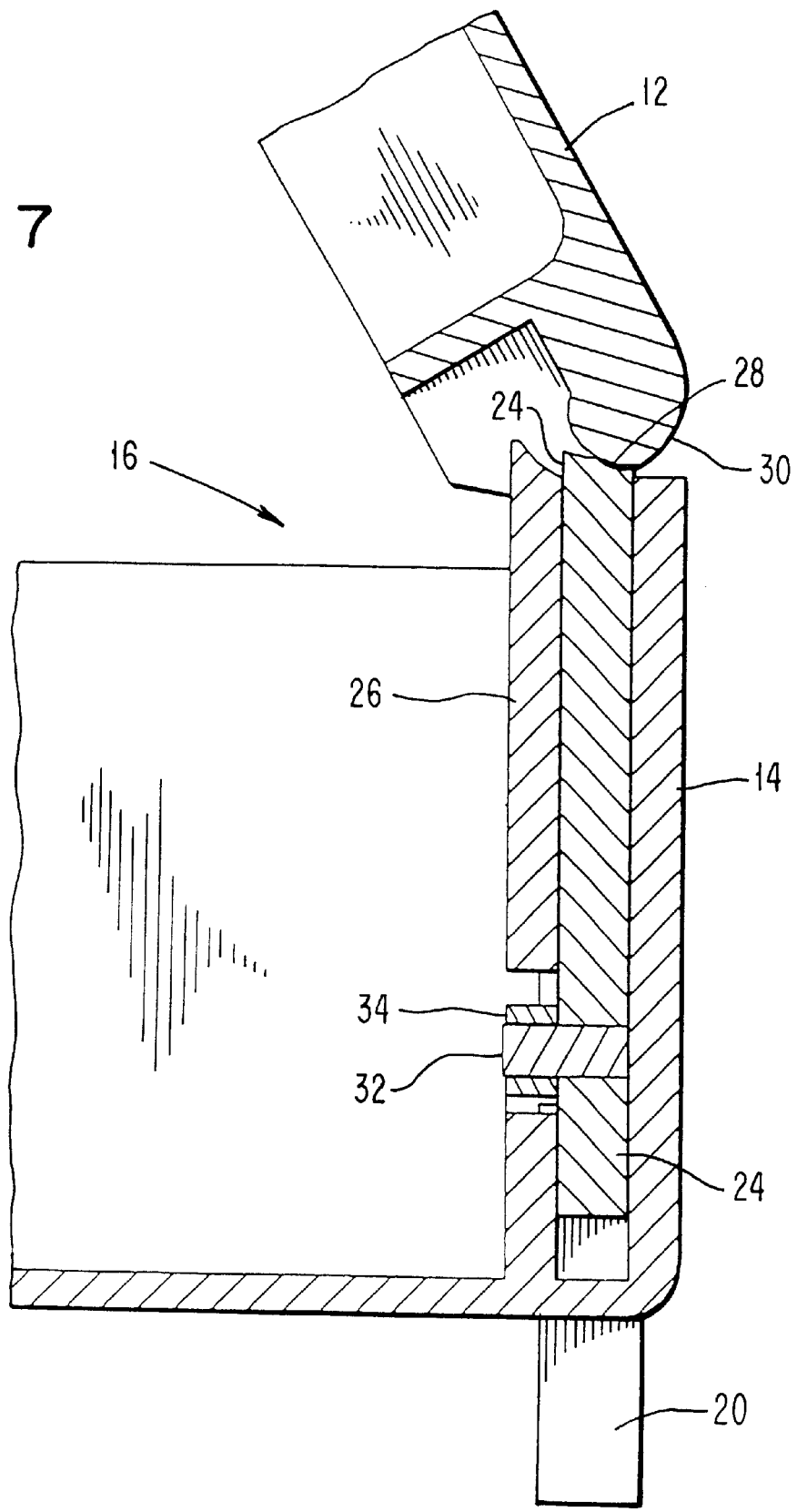
FIG. 7 represents a cross-sectional view of the embodiment of the leg deployment and retraction mechanism shown in FIGS. 3–6, with the display located between an opened and a closed position with the leg in a partially deployed position.

FIG. 7 provides a cross-sectional view of the display 12, cam 30, plunger 24, plunger cam surface 28, pivot lever 34, pin 32, and the action of these elements of the present invention. FIG. 7 shows display 12 in a partly open position with automatic leg deploying and retracting mechanism 16 approximately halfway between the fully retracted position and fully deployed position. Cam 30 is shown as an integral part of display cover 12, although it could be a separate piece attached to display cover 12.

In order to gain the full benefit of removing heat from the bottom surface of the portable personal computer, it is desirable to have the legs fully deployed anytime the computer is in use. The cam 30 shown in FIG. 7 is shaped in such a way that the downward motion of plunger 24 is completed at the point when display cover 12 has opened to approximately 90 degrees or in a nearly vertical position. Moving display 12 beyond this position will not cause plunger 24 to move further. Thus the deployment of legs 20 and 22 is completed before display cover 12 is opened to a usable position.

Figure 8:
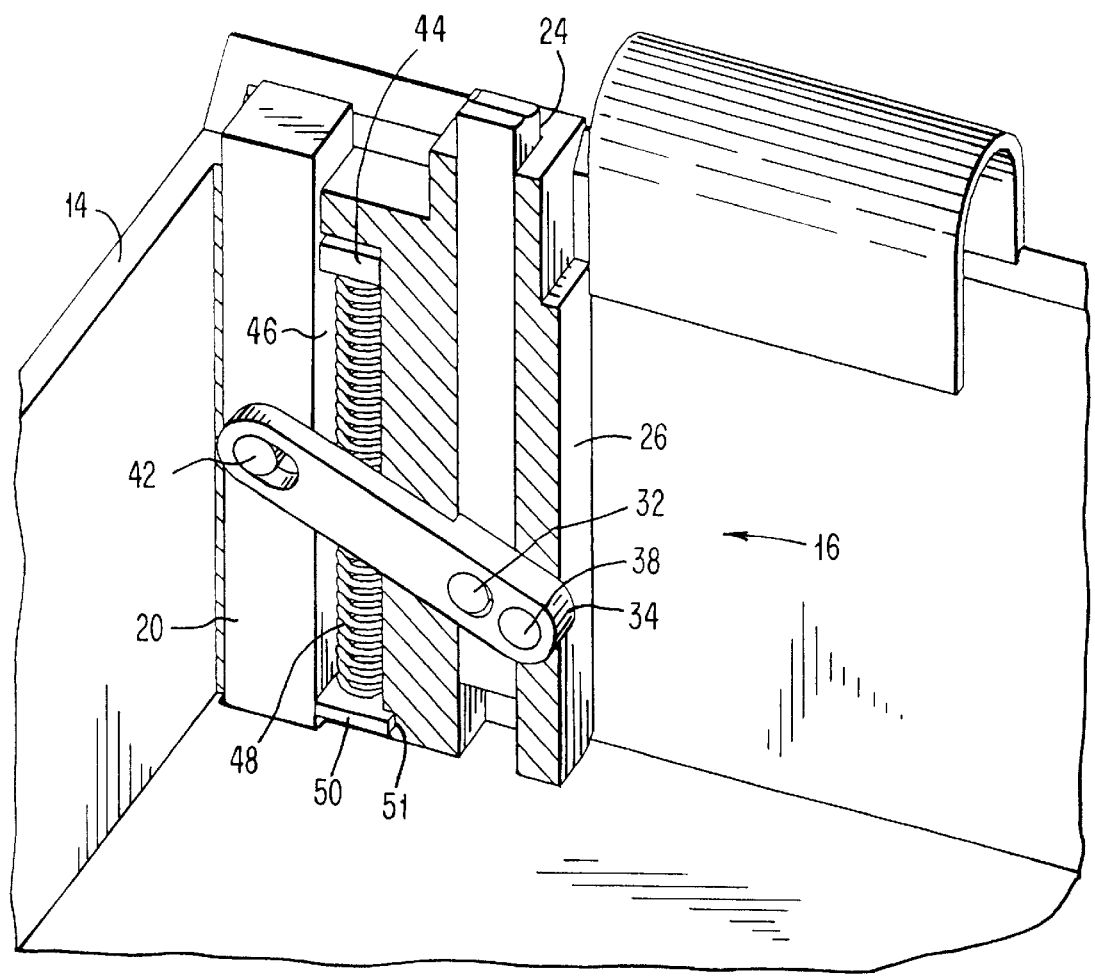
FIG. 8 represents a top front perspective close-up view of the embodiment of the leg deployment and retraction mechanism shown in FIG. 4 with the housing cut away to reveal additional internal parts of the leg deployment and retraction mechanism.

FIG. 8 illustrates a substantially similar view to the view shown in FIG. 4. However, in FIG. 8, housing 26 has been cut away to illustrate additional elements that may be included in the present invention. The additional parts may be internal of cover 16 and may not normally be visible.

FIG. 8 shows a spring 48 that biases leg 20 in a retracted position. Typically, spring 48 is a compression spring. In the embodiment shown in FIG. 8, spring 48 is housed in within a cavity 46 provided in housing 26.

In the embodiment shown in FIG. 8, a tab 44 is provided on leg 20 for engaging spring 48. Tab 44 may be attached to leg 20. Alternatively, leg 20 and tab 44 may be formed as an integral unit.

Stop 50 may be arranged in cavity 46 in housing 26. alternatively, spring 48 may engage the upper inner surface of the base 14 of the computer. In the embodiment shown in FIG. 8, stop 50 is held in place by a groove 51 formed in the housing. In the embodiment shown in FIG. 8, compression spring 48 rests on stop 50.

In the embodiment shown in FIG. 8, as leg 20 moves in a downward direction as described above in greater detail, spring 48 is compressed thus imparting an upward force on leg 20 through tab 44. Thus, when the display cover 12 is closed, the force generated by spring 48 returns mechanism 16 and, hence, leg 20 to a retracted position.

It should be obvious to those skilled in the art that there are many other mechanisms that could successfully be used to accomplish what is disclosed here. For example, the present invention includes an automatically deploying and retracting leg for a portable personal computer including a base and a display. The automatically deploying and retracting leg includes at least one leg arranged in the base. The leg moves downwardly as it is deployed. At least one deploying mechanism is interconnected with the at least one leg and the display so as to cause the at least one leg to deploy and retract upon moving said display respectively between and open and a closed position. A wide variety of means could be used to fulfill these functions.

For example, the automatically deploying and retracting leg of the invention may include at least one cam located on the display. At least one cam surface on the at least one deploying mechanism. The display cam may act on the at least one deploying mechanism cam surface so as to cause the at least one leg to deploy and retract upon moving the display respectively between and open and a closed position. Once again, there is not requirement that the invention include a plunger and pivot lever as described above for carrying out these functions.

Figure 9:
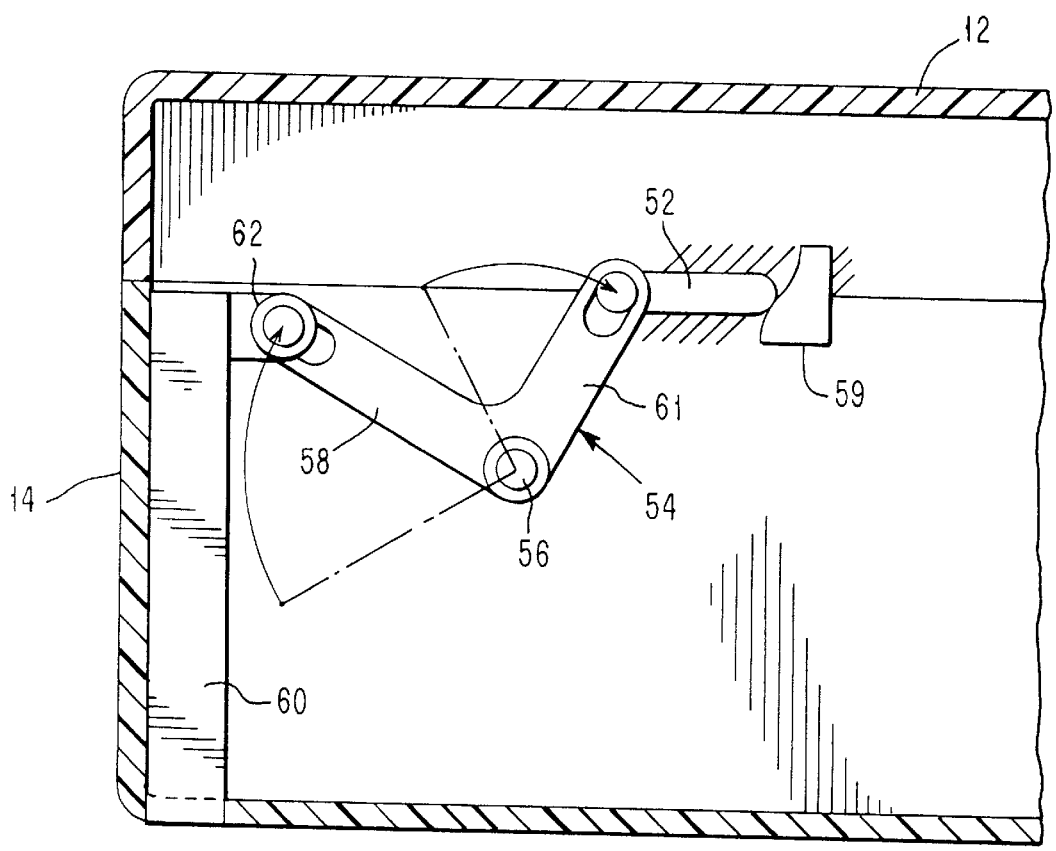
FIG. 9 represents a partial cross-sectional view of an additional embodiment of a leg deployment and retraction mechanism according to the present invention.

For example, FIG. 9 illustrates an alternative automatic leg deploying and retracting mechanism that includes a sliding member 52. Display 12 includes a cam 59 that rotates as the display is moved between an open and a closed position. Cam 59 acts on horizontally moving sliding member 52 to move the sliding member 52 to the left in the view shown in FIG. 9.

The embodiment shown in FIG. 9 also includes a lever 54 that is rotatably interconnected with the computer base 14 about pivot point 56. Either the lever 54 or base may include a pin and the other of the lever and the base may include a passage for receiving the pin.

Lever 54 includes two arms 58 and 61 that form an angle. The angle may vary, depending upon the space involved in the computer base and the desired amount of leg deployment relative to display movement that is desired, among other factors. Lever arm 61 may be pivotably interconnected with sliding member 52. The interconnection between lever arm 61 and sliding member 52 may be similar to the interconnection between pivot lever 34 and plunger 24 in that it may include a pin, a pin receiving passage and that the pin receiving passage may be elongated. Therefore, the above description of the interconnection is referenced here.

Pivot arm 58 may be similarly pivotably interconnected to leg 60. Leg 60 may include an extension 62 for connecting to pivot arm 58.

In the embodiment shown in FIG. 9, cam 59 acts on sliding member 52, causing sliding arm to slide. Sliding movement of sliding arm 52 sliding rotates lever arm 54 about pivot point 56. Lever arm 58 pivots downward to impart downward motion on leg 60.

The present invention also includes a device for enhancing the power dissipation of portable personal computers by using an automatic leg deployment mechanism to raise the rear of the computer to allow ambient air to naturally connect additional heat away from the bottom surface of the computer.

Other aspects of the present invention provide a portable personal computer including at least one automatically deploying and retracting leg as described above.

Additional aspects of the present invention provide a method for automatically deploying and retracting at least one leg of a portable personal computer as described above. The method includes providing at least one leg and deploying and retracting mechanism as described above. The display is moved from a closed to an open position, thereby causing the at least one deploying mechanism to cause the at least one leg to deploy by moving downwardly relative to the base. The display is moved from the open to the closed position, thereby causing the at least one deploying mechanism to cause the at least one leg to retract by moving upwardly relative to the base.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

I claim:

1. An automatically deploying and retracting leg for a portable personal computer including a base and a display, comprising:

at least one computer supporting leg arranged in the base and moving downwardly as it is deployed for permitting a bottom surface of the computer to be raised above an underlying supporting surface; and at least one deploying mechanism interconnected with said at least one leg and said display so as to cause said at least one leg to deploy and retract upon moving said display respectively between and open and a closed position.

2. The automatically deploying and retracting leg according to claim 1, further comprising:

at least one cam on said display; and at least one cam surface on said at least one deploying mechanism, said display cam acting on said at least one deploying mechanism cam surface so as to cause said at least one leg to deploy and retract upon moving said display respectively between and open and a closed position.

3. The automatically deploying and retracting leg according to claim 2, wherein said at least one deploying mechanism comprises:

at least one plunger, said at least one plunger including said at least one deploying mechanism cam surface; and at least one pivot lever pivotably connected to both said at least one plunger and said at least one leg, said at least one pivot lever being pivotably interconnected with said base of said portable personal computer at a pivot point, said pivot lever including said deploying mechanism cam surface wherein moving said display between an open and a closed position causes said display cam to act on said deploying mechanism cam surface, thereby causing said pivot lever to pivot and said at least one leg to deploy.

4. The automatically deploying and retracting leg according to claim 3, wherein said at least one pivot lever is pivotably connected to said at least one plunger with a pin provided on one of said pivot lever and said plunger and a passage for engaging said pin provided on the other of said pivot lever and said plunger, and wherein said pivot lever is pivotably connected to said at least one leg with a pin provided on one of said pivot lever and said at least one leg and a passage for engaging said pin provided on the other of said pivot lever and said at least one leg.

5. The automatically deploying and retracting leg according to claim 3, wherein said passages in said plunger, pivot lever, or at least one leg are elongated in the direction of the longitudinal axis of the member that they are located on.

6. The automatically deploying and retracting leg according to claim 3, wherein said passages are located on said pivot lever and said pins are located on said plunger and said at least one leg.

7. The automatically deploying and retracting leg according to claim 6, wherein said pivot lever and said plunger are pivotably interconnected at a point about 4 mm from the pivot point where said pivot lever is pivotably interconnected with said base, and said pivot lever is pivotably interconnected with said at least one leg at a point about 20 mm from the point where said pivot lever and said plunger are interconnected.

8. The automatically deploying and retracting leg according to claim 3, wherein moving said display between an open and a closed position causes said cam on said display to move along said cam surface on said plunger causing said plunger to pivot downward about its interconnection with said base, said pivot arm causing said at least one leg to move downward simultaneously with said downward pivot of said pivot lever.

9. The automatically deploying and retracting leg according to claim 3, further comprising:
a deploying mechanism housing for housing said deploying mechanism and said at least one leg.

10. The automatically deploying and retracting leg according to claim 9, wherein said housing is joined to said base.

11. The automatically deploying and retracting leg according to claim 9, wherein said housing is integral with said base.

12. The automatically deploying and retracting leg according to claim 3, further comprising:
a spring for biasing said at least one leg in a closed position, wherein said at least one leg is retracted within said base.

13. The automatically deploying and retracting leg according to claim 2, wherein said deploying mechanism comprises:
at least one sliding member slidably interconnected with said base, said at least one sliding member including said at least one deploying mechanism cam surface, wherein moving said display between an open and a closed position causes said at least one display cam to act on said at least one deploying mechanism cam surface, thereby causing said at least one sliding member to slide and said at least one leg to deploy; and
at least one pivot lever pivotably interconnected with said base at a pivot point, pivotably connected to said at least one sliding member, and pivotably connected to said at least one leg.

14. The automatically deploying and retracting leg according to claim 13, wherein said at least one pivot lever is pivotably connected to said at least one sliding member with a pin provided on one of said pivot lever and said sliding member and a passage for engaging said pin provided on the other of said pivot lever and said at least one sliding member, and wherein said pivot lever is pivotably connected to said at least one leg with a pin provided on one of said pivot lever and said at least one leg and a passage for engaging said pin provided on the other of said pivot lever and said at least one leg.

15. The automatically deploying and retracting leg according to claim 14, wherein said passages in said sliding member, said pivot lever, or at least one leg are elongated in the direction of the longitudinal axis of the member that they are located on.

16. The automatically deploying and retracting leg according to claim 14, wherein said passages are located on said pivot lever.

17. The automatically deploying and retracting leg according to claim 14, wherein moving said display between an open and a closed position causes said cam on said display to move along said cam surface on said sliding member causing said sliding member to slide at its interconnection with said base, movement of said sliding member simultaneously causing said pivot lever to pivot about said pivot point, pivoting of said pivot lever simultaneously causing at least one leg to move downward simultaneously with said pivot of said pivot arm.

18. The automatically deploying and retracting leg according to claim 17, further comprising:
a spring for biasing said at least one leg in a closed position, wherein said at least one leg is retracted within said base.

19. The automatically deploying and retracting leg according to claim 1, wherein said at least one leg extends below a bottom surface of said base by about 15 mm to about 30 mm.

20. The automatically deploying and retracting leg according to claim 1, including two legs and two deploying mechanisms.

21. The automatically deploying and retracting leg according to claim 1, wherein said at least one leg is fully deployed before said display is moved to a usable position.

22. The automatically deploying and retracting leg according to claim 1, wherein the at least one leg moves downward linearly as it is deployed.

23. A portable personal computer, comprising:
a base;
a display pivotably joined to said base;
at least one computer supporting leg arranged in the base and moving downwardly as it is deployed for permitting a bottom surface of the computer to be raised above an underlying supporting surface; and
at least one deploying mechanism interconnected with said at least one leg and said display so as to cause said at least one leg to deploy and retract upon moving said display respectively between and open and a closed position.

24. A method for deploying and retracting at least one leg of a portable personal computer including a base and a display, said method comprising the steps of:
providing at least one computer supporting leg arranged in the base and moving downwardly as it is deployed;
providing at least one deploying mechanism interconnected with said at least one leg and said display so as to cause said at least one leg to deploy and retract upon moving said display respectively between and open and a closed position;
moving said display from a closed to an open position, thereby causing said at least one deploying mechanism to cause said at least one leg to deploy by moving downwardly relative to said base, thereby permitting a bottom surface of the computer to be raised above an underlying supporting surface; and
moving said display from said open to said closed position, thereby causing said at least one deploying mechanism to cause said at least one leg to retract by moving upwardly relative to said base.

25. A method for temperature management in a portable personal computer including a base and a display, said method comprising the steps of:
providing said computer with at least one automatically deploying and retracting computer supporting leg arranged in the base and moving downwardly as it is deployed and at least one deploying mechanism interconnected with said at least one leg and said display so as to cause said at least one leg to deploy and retract upon moving said display respectively between and open and a closed position;

providing power to said computer;

moving said display from a closed to an open position, thereby causing said at least one deploying mechanism to cause said at least one leg to deploy by moving downwardly relative to said base, thereby permitting a bottom surface of the computer to be raised above an underlying supporting surface; and moving said display from said open to said closed position, thereby causing said at least one deploying mechanism to cause said at least one leg to retract by moving upwardly relative to said base.

26. An automatically deploying and retracting leg for a portable personal computer including a base and a display, comprising:

at least one computer supporting leg arranged in the base and moving downwardly from the computer as it is deployed, thereby permitting a bottom surface of the computer to be raised;

at least one deploying mechanism interconnected with said at least one leg and said display so as to cause said at least one leg to deploy and retract upon moving said display respectively between and open and a closed position.

27. An automatically deploying and retracting leg for a portable personal computer including a base and a display, comprising:

at least one leg arranged in the base and moving downwardly as it is deployed;

at least one cam on said display;

at least one deploying mechanism interconnected with said at least one leg and said display so as to cause said at least one leg to deploy and retract upon moving said display respectively between and open and a closed position, said at least one deploying mechanism comprising at least one plunger including at least one cam surface, at least one pivot lever pivotably connected to both said at least one plunger and said at least one leg, said at least one pivot lever being pivotably interconnected with said base of said portable personal computer at a pivot point, said pivot lever including said deploying mechanism cam surface wherein moving said display between an open and a closed position causes said display cam to act on said deploying mechanism cam surface, thereby causing said pivot lever to pivot and said at least one leg to deploy.

28. The automatically deploying and retracting leg according to claim 27, wherein said at least one pivot lever is pivotably connected to said at least one plunger with a pin provided on one of said pivot lever and said plunger and a passage for engaging said pin provided on the other of said pivot lever and said plunger, and wherein said pivot lever is pivotably connected to said at least one leg with a pin provided on one of said pivot lever and said at least one leg and a passage for engaging said pin provided on the other of said pivot lever and said at least one leg.

29. The automatically deploying and retracting leg according to claim 27, wherein said passages in said plunger, pivot arm, or at least one leg are elongated in the direction of the longitudinal axis of the member that they are located on.

30. The automatically deploying and retracting leg according to claim 27, wherein said passages are located on said pivot arm and said pins are located on said plunger and said at least one leg.

31. The automatically deploying and retracting leg according to claim 27, wherein moving said display between an open and a closed position causes said cam on said display to move along said cam surface on said plunger causing said plunger to pivot downward about its interconnection with said base, said pivot arm causing said at least one leg to move downward simultaneously with said downward pivot of said pivot arm.

32. The automatically deploying and retracting leg according to claim 27, further comprising:

a deploying mechanism housing for housing said deploying mechanism and said at least one leg.

33. The automatically deploying and retracting leg according to claim 32, wherein said housing is joined to said base.

34. The automatically deploying and retracting leg according to claim 32, wherein said housing is integral with said base.

35. The automatically deploying and retracting leg according to claim 27, further comprising:

a spring for biasing said at least one leg in a closed position, wherein said at least one leg is retracted within said base.

36. The automatically deploying and retracting leg according to claim 30, wherein said pivot lever and said plunger are pivotably interconnected at a point about 4 mm from the pivot point where said pivot lever is pivotably interconnected with said base, and said pivot lever is pivotably interconnected with said at least one leg at a point about 20 mm from the point where said pivot lever and said plunger are interconnected.

* * * * *